United States Patent
Nojiri et al.

(10) Patent No.: US 9,821,912 B2
(45) Date of Patent: Nov. 21, 2017

(54) AIRCRAFT GALLEY UNIT

(71) Applicant: JAMCO Corporation, Mitaka-shi, Tokyo (JP)

(72) Inventors: Kenji Nojiri, Mitaka (JP); Yoshihisa Tsutsui, Mitaka (JP)

(73) Assignee: JAMCO CORPORATION, Tokyo (JP)

( * ) Notice: Subject to any disclaimer, the term of this patent is extended or adjusted under 35 U.S.C. 154(b) by 0 days.

(21) Appl. No.: 15/102,380

(22) PCT Filed: Jul. 11, 2014

(86) PCT No.: PCT/JP2014/068547
§ 371 (c)(1),
(2) Date: Jun. 7, 2016

(87) PCT Pub. No.: WO2016/006093
PCT Pub. Date: Jan. 14, 2016

(65) Prior Publication Data
US 2016/0311534 A1    Oct. 27, 2016

(51) Int. Cl.
*B64D 11/00* (2006.01)
*B64D 11/04* (2006.01)

(52) U.S. Cl.
CPC ......... *B64D 11/04* (2013.01); *B64D 11/0007* (2013.01)

(58) Field of Classification Search
CPC .................... B64D 11/0007; B64D 11/04
See application file for complete search history.

(56) References Cited

U.S. PATENT DOCUMENTS

| | | | |
|---|---|---|---|
| RE32,176 E * | 6/1986 | Vernon | A47B 77/02 186/40 |
| 5,074,496 A * | 12/1991 | Rezag | B65G 1/0407 105/327 |
| 5,314,143 A * | 5/1994 | Luria | B64D 11/0007 104/88.01 |
| 5,496,000 A | 3/1996 | Mueller | |
| 6,340,136 B1 | 1/2002 | Luria | |
| 6,412,603 B1 | 7/2002 | Nervig et al. | |
| 6,454,208 B1 | 9/2002 | Nervig et al. | |
| 6,971,608 B2 * | 12/2005 | Harrington | B64D 11/04 244/118.5 |

(Continued)

FOREIGN PATENT DOCUMENTS

JP    2010-512269 A    4/2010

OTHER PUBLICATIONS

International Search Report dated Oct. 7, 2014, issued in counterpart International Application No. PCT/JP2014/068547, w/English translation (4 pages).

(Continued)

*Primary Examiner* — Philip J Bonzell
(74) *Attorney, Agent, or Firm* — Westerman, Hattori, Daniels & Adrian, LLP

(57) ABSTRACT

An aircraft galley unit includes a housing defining an outer shell, and a rack area and a double deck area arranged within the housing, wherein the double deck area includes a hoistway formed in an interior of the housing, a lifting mechanism moving up and down within an area of the hoist way, and a driving source for moving the lifting mechanism up and down, and the driving source is arranged on a ceiling portion of the housing.

10 Claims, 2 Drawing Sheets

(56) References Cited

U.S. PATENT DOCUMENTS

| | | | |
|---|---|---|---|
| 7,494,091 B2* | 2/2009 | Harrington | B64D 11/0007 |
| | | | 212/312 |
| 2005/0133308 A1* | 6/2005 | Reysa | B64D 11/04 |
| | | | 186/40 |
| 2005/0224646 A1 | 10/2005 | Mills | |
| 2006/0186268 A1 | 8/2006 | Harrington et al. | |
| 2008/0136299 A1 | 6/2008 | Peurifoy | |
| 2012/0325960 A1 | 12/2012 | Saint-Jalmes et al. | |

OTHER PUBLICATIONS

Written Opinion dated Oct. 7, 2014, issued in counterpart International Application No. PCT/JP2014/068547, w/English translation (8 pages).

Notification of Reasons for Refusal dated Jun. 2, 2015, issued in counterpart Japanese Patent Application No. 2015-518679, w/English translation (6 pages).

Decision to Grant a Patent dated Sep. 15, 2015, issued in counterpart Japanese Patent Application No. 2015-518679, w/English translation (6 pages).

* cited by examiner

AIRCRAFT GALLEY UNIT

TECHNICAL FIELD

The present invention relates to a configuration of a galley (kitchen) unit installed in a passenger aircraft.

BACKGROUND ART

Galley units to be installed in passenger aircrafts are required to achieve space-saving of the galley unit itself, in order to increase number of seats so as to increase the number of passengers, or to secure distances between seats in consideration of ride quality for the passengers.

However, the increase in the number of passengers leads to increase in amount of foods and drinks served on the aircraft, so that the number of carts for carrying the foods and drinks tends to be increased, and the amount of stock of foods and drinks also tends to be increased.

In order to satisfy the above-described needs within the limited space of the passenger aircraft, there has been known a galley unit configured to include a cart lift with a platform for supporting a cart thereon, and storing carts in two levels (refer for example to Patent Literature 1).

This configuration enables to realize conventional carts which are heavy and have wheels to be stored in an elevated location safely and reliably, and to increase the number of carts being stored.

CITATION LIST

Patent Literature

[PTL 1] Japanese Translation of PCT International Application Publication No. 2010-512269

SUMMARY OF INVENTION

Technical Problem

However, since the galley unit having the structure disclosed in Patent Literature 1 moves the platform in an up-and-down motion, there was a need to provide a support pillar standing upright to cover the whole drive range of the platform, and it was indispensable to ensure enough space for installing such support pillar within the galley itself.

Since the galley itself is generally integrated in a large housing, the area for installing the above-described cart lift and support pillar is restricted to either the right end side or the left end side of the housing, by which the layout of the cart lift is restricted.

Therefore, the object of the present invention is to provide a galley capable of ensuring sufficient storage space for storing carts and other loads, and having much freedom of layout.

Solution to Problem

In order to solve the problems mentioned above, the present invention provides an aircraft galley unit including a housing defining an outer shell, and a rack area and a double deck area arranged within the housing, wherein the double deck area includes a hoist-way formed in an interior of the housing, a lifting mechanism moving up and down within an area of the hoist way, and a driving source for moving the lifting mechanism up and down, and the driving source is arranged on a ceiling portion of the housing.

According to one aspect of the aircraft galley unit of the present invention, the double deck area includes a door disposed at a lower end side of the hoist-way, and the hoist-way is configured to form a sealed space when the door is closed.

In this case, the double deck area can further be equipped with a temperature control mechanism configured to control an internal temperature of the hoist-way.

According to another aspect of the aircraft galley unit of the present invention, a height of the housing can be set higher than at least a ceiling of a cabin of the aircraft.

Advantageous Effects of Invention

According to a storage configuration of the aircraft galley unit of the present invention, storage space for storing carts and other loads can be sufficiently secured, and great freedom of layout can be realized.

DESCRIPTION OF EMBODIMENTS

Figure 1:
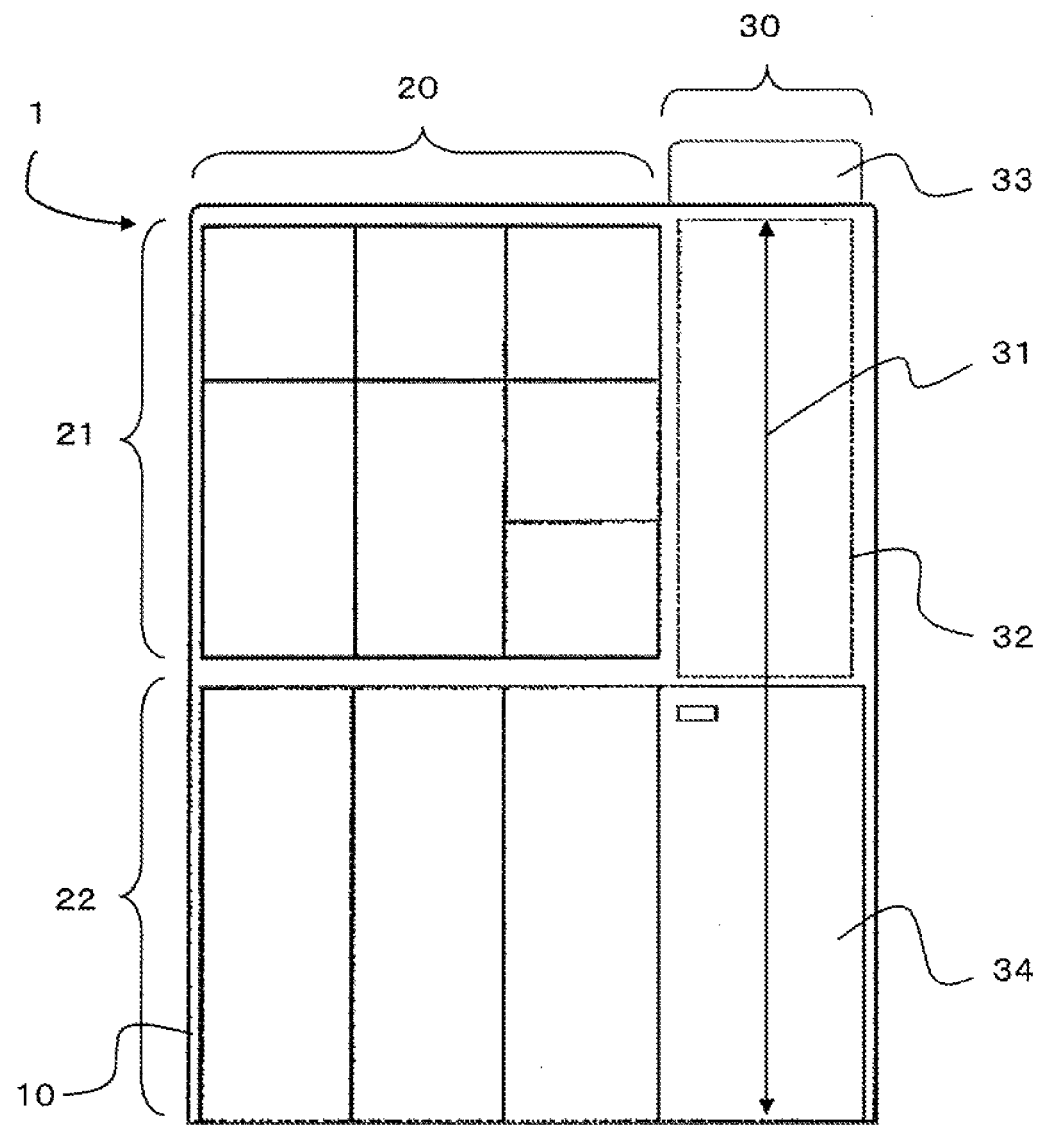
FIG. 1 is a front view of a general outline of a galley unit installed in an aircraft according to the present invention.

FIG. 1 is a front view of a general outline of a galley unit installed in an aircraft according to the present invention.

As illustrated in FIG. 1, a galley unit 1 according to the present invention includes a housing 10 defining an outer shell, a rack area 20, and a double deck area 30.

The rack area 20 is composed, for example, of an upper rack area 21 and a lower rack area 22, as illustrated in FIG. 1.

The upper rack area 21 allows units such as containers, ovens, microwave ovens and coffee makers to be arranged individually therein, and the lower rack area 22 allows carts and wagons with casters to be stored therein. The lower rack area 22 can also include a storage area for containers.

The double deck area 30 includes a hoist-way (hoistway) 31, a box-like lifting mechanism 32 moving up and down within the hoist-way 31, and a driving source 33 for moving the lifting mechanism 32 up and down.

The hoist-way 31 has sufficient space for storing the lifting mechanism 32 in two vertical levels, and the driving source 33 is arranged on a ceiling portion of the housing 10 corresponding to the double deck area 30.

By adopting this configuration, a structure corresponding to the support pillar adopted in the conventional art for moving the lifting mechanism up and down will no longer be required, so that the space of the galley unit 1 can be expanded, and as a result, a wider storage space for storing carts and containers can be secured.

During use of the galley unit 1 including the double deck area 30 according to the present invention, a cabin crew drives the driving source 33 to place the lifting mechanism 32 at a lower position, and stores a cart, a container, a wagon and so on within the lifting mechanism 32. Thereafter, the cabin crew drives the driving source 33 to place the lifting mechanism 32 at an upper position, and for example, stores a different cart in the space at the lower position created by the movement of the lifting mechanism 32.

As described, efficient use of space can be realized by storing heavy carts with wheels one above the other in two vertical levels.

According to the embodiment illustrated in FIG. 1, the lifting mechanism 32 has a box-like shape, but other shapes can be adopted as long as the lifting mechanism can move up and down while having load placed therein. For example, a pallet-like shape can be adopted as the lifting mechanism, but it is preferable to adopt a box-like shape as the lifting mechanism 32 so that the load can be stored reliably even when the load is moved by the shaking of the aircraft.

Further, a known driving system, such as a rope type system or hydraulic system, can be adopted as the driving source 33. It is also possible to additionally provide a means (not shown) for manually locking and unlocking the position of the lifting mechanism 32 being moved up and down by the driving source.

A door 34 is disposed only at the lower area in the hoist-way 31 of the double deck area 30 illustrated in FIG. 1. According to this configuration, the hoist-way 31 is formed as a sealed space when the door 34 is closed, and for example, it can be used as a refrigerating chamber by lowering the temperature within the space by air conditioning, with carts, containers and so on stored therein.

Further, since a sealed state can be created, even when storing loads that become unstable from shaking, such as carts and wagons with wheels, the loads will not fly out of the galley unit 1, and safety can be secured.

The above-described configuration of forming a sealed space by a door can also be applied to the rack area 20. It is also possible not to provide doors on the upper and lower areas of the double deck area 30, so that loads can be accessed directly.

Figure 2:
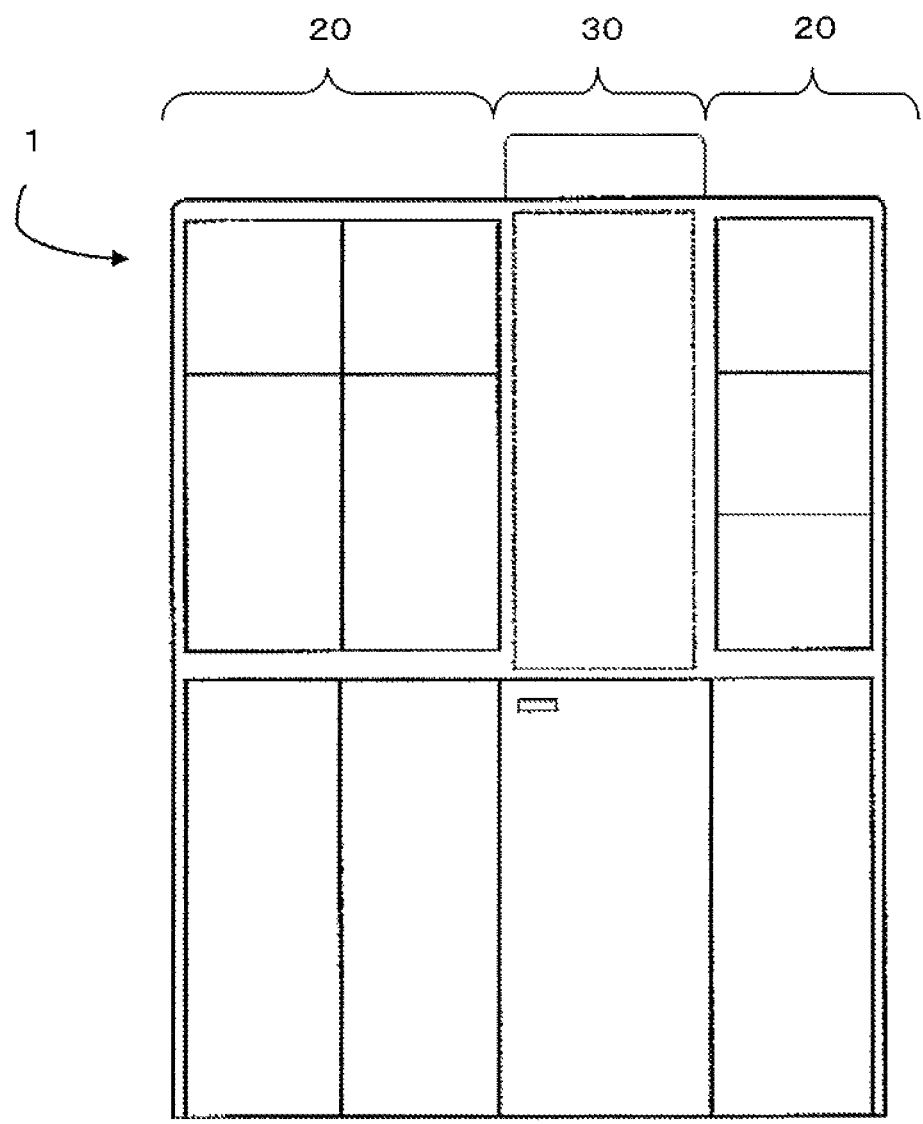
FIG. 2 is a front view of a general outline of a galley unit according to a modified example of the present invention.

FIG. 2 is a front view of a general outline of a galley unit according to a modified example of the present invention.

In the actual example illustrated in FIG. 1, an example has been illustrated where the double deck area 30 is arranged at the left or right end side of the housing 10, but as illustrated in FIG. 2, it is also possible to have the double deck area 30 arranged at an intermediate portion between the left and right end sides of the housing 10. Further, it is possible to arrange the double deck area 30 at multiple areas within the housing 10.

By adopting this configuration, the double deck area 30 can be arranged at an arbitrary area within the housing 10, so that the degree of freedom of layout of the rack area 20 and the double deck area 30 can be increased, and efficient use of storage space can be further enhanced.

As another modified example, it is possible to adopt a configuration where the height of the housing 10 is set higher than a ceiling of a cabin room, or where a ceiling portion of the housing 10 also functions as the ceiling of the cabin room, and the driving source 33 is arranged above the ceiling.

By adopting this configuration, the space that has been used for arranging the driving source can be applied as storage space, so that a larger storage space can be secured. Further, since the driving source 33 is arranged above the ceiling, noise that occurs when the driving source 33 is driven can be eliminated from the passenger cabin.

REFERENCE SIGNS LIST

1 Galley unit
10 Housing
20 Rack area
30 Double deck area
31 Hoist-way
32 Lifting mechanism
33 Driving source
34 Door

The invention claimed is:

1. An aircraft galley unit comprising:
a housing defining an outer shell of the galley unit in a cabin of the aircraft;
a rack area arranged within the housing; and
a double deck area arranged within the housing,
wherein the double deck area comprises:
a hoistway formed in an interior of the housing;
a lifting mechanism moving up and down within an area of the hoistway for lifting a load above a floor of the cabin; and
a driving source for moving the lifting mechanism up and down,
wherein the lifting mechanism has a box-like external shape,
wherein the rack area comprises a first rack area and a second rack area,
wherein the double deck area is arranged in a manner sandwiched between the first rack area and the second rack area; and
wherein the driving source is arranged on a ceiling portion of the housing.

2. The aircraft galley unit according to claim 1, wherein a height of the housing is set to be higher than at least a ceiling of a cabin of the aircraft.

3. The aircraft galley unit according to claim 1, wherein the double deck area comprises:
a door disposed at a lower end side of the hoistway,
wherein the hoistway is configured to form a sealed space when the door is closed.

4. The aircraft galley unit according to claim 3, wherein a height of the housing is set to be higher than at least a ceiling of a cabin of the aircraft.

5. The aircraft galley unit according to claim 3, wherein the double deck area further comprises:
a temperature control mechanism configured to control an internal temperature of the hoistway.

6. The aircraft galley unit according to claim 5, wherein a height of the housing is set to be higher than at least a ceiling of a cabin of the aircraft.

7. An aircraft galley unit comprising:
a housing defining an outer shell of the galley unit;
a rack area arranged within the housing; and
a double deck area arranged within the housing,
wherein the rack area comprises a first rack area and a second rack area,
wherein the first rack area comprises an upper rack area and a lower rack area;
wherein the double deck area comprises:
an upper area laterally disposed from the upper rack area;
a lower area laterally disposed from the lower rack area;
a hoistway formed in an interior of the housing;
a lifting mechanism moving between the upper area and the lower area within an area of the hoistway; and
a driving source for moving the lifting mechanism up and down,
wherein the lifting mechanism has a box-like external shape,
wherein the double deck area is arranged in a manner sandwiched between the first rack area and the second rack area; and
wherein the driving source is arranged on a ceiling portion of the housing.

8. The aircraft galley unit according to claim 7, wherein the double deck area comprises:
a door disposed at a lower end side of the hoistway,
wherein the upper area and the lower area are configured to form a sealed space when the door is closed.

9. An aircraft galley unit comprising:
a housing defining an outer shell of the galley unit;
a rack area arranged within the housing; and
a double deck area arranged within the housing,
wherein the double deck area comprises:
   a hoistway formed in an interior of the housing;
   a lifting mechanism moving up and down within an area of the hoistway;
   a driving source for moving the lifting mechanism up and down, and
   an upper area to store a load on the lifting mechanism and a lower area to store another load below the lifting mechanism when the lifting mechanism is located at an upper position,
wherein the lifting mechanism has a box-like external shape,
wherein the rack area comprises a first rack area and a second rack area,
wherein the double deck area is arranged in a manner sandwiched between the first rack area and the second rack area; and
wherein the driving source is arranged on a ceiling portion of the housing.

10. The aircraft galley unit according to claim 9, wherein the double deck area comprises:
a door disposed at a lower end side of the hoistway,
wherein the upper area and the lower area are configured to form a sealed space when the door is closed.

* * * * *